United States Patent
Kuo et al.

(10) Patent No.: US 6,873,715 B2
(45) Date of Patent: Mar. 29, 2005

(54) SYSTEM OF CENTRAL SIGNATURE VERIFICATIONS AND ELECTRONIC RECEIPT TRANSMISSIONS

(76) Inventors: You-Ti Kuo, 88 Foxbourne Rd., Penfield, NY (US) 14526; Shirphone Kuo, 1086 Edgewater Blvd., Foster City, CA (US) 94404

( * ) Notice: Subject to any disclaimer, the term of this patent is extended or adjusted under 35 U.S.C. 154(b) by 597 days.

(21) Appl. No.: 10/059,477

(22) Filed: Jan. 31, 2002

(65) Prior Publication Data

US 2003/0142855 A1 Jul. 31, 2003

(51) Int. Cl.[7] .................................................. G06K 9/00
(52) U.S. Cl. ...................... 382/119; 382/140; 382/190; 235/380; 235/454; 235/493; 340/5.4
(58) Field of Search ............................. 382/115, 119, 382/139, 140, 190; 235/380, 454, 493; 340/5.1, 5.4

(56) References Cited

U.S. PATENT DOCUMENTS

| | | | |
|---|---|---|---|
| 4,985,928 A | 1/1991 | Campbell et al. ............... 382/3 |
| 5,091,968 A | 2/1992 | Higgins et al. ............... 382/30 |
| 5,251,265 A | 10/1993 | Dohle et al. ................... 382/3 |
| 5,559,895 A | 9/1996 | Lee et al. ................... 382/119 |
| 5,680,470 A | 10/1997 | Moussa et al. ............. 382/119 |
| 5,739,512 A | 4/1998 | Tognazzini ................. 235/380 |
| 5,767,496 A | * 6/1998 | Swartz et al. ............ 235/462.1 |
| 5,828,772 A | 10/1998 | Kashi et al. ................ 382/119 |
| 5,933,531 A | 8/1999 | Lorie ......................... 382/229 |
| 5,938,726 A | * 8/1999 | Reber et al. ................ 709/217 |
| 5,942,733 A | 8/1999 | Allen et al. ............... 178/18.01 |
| 5,960,100 A | 9/1999 | Hargoove ................... 382/124 |
| 5,992,753 A | 11/1999 | Xu ........................ 235/472.01 |
| 6,002,389 A | 12/1999 | Kasser ...................... 345/173 |
| 6,076,731 A | 6/2000 | Terrell ....................... 235/454 |
| 6,118,889 A | 9/2000 | Izuno et al. ................ 382/119 |
| 6,185,542 B1 | 2/2001 | Moran et al. ................. 705/16 |
| 6,188,309 B1 | 2/2001 | Levine ...................... 340/5.66 |
| 6,193,152 B1 | 2/2001 | Fernando et al. .......... 235/380 |
| 2002/0047047 A1 | * 4/2002 | Poloniewicz et al. ....... 235/454 |

* cited by examiner

Primary Examiner—Jon Chang
Assistant Examiner—Charles Kim

(57) ABSTRACT

A credit-card reader having a built-in digital camera for capturing a template signature and an email address on a credit card. The email address is identified by an optical character recognition program and input to an email system. A test signature is entered on a touch-pad input device and both the test and the template signatures are normalized and displayed for verification. Action buttons are provided on the display screen for enforcing the signature verification actions. The system enables the transmission of an electronic receipt selectively controlled by the customer and eliminates the needs of physically handling a credit card for signature verification and manual input or pre-registration of an email address for an electronic receipt. The computer-assisted features enables a central system of signature verification for purchase transactions at self-service check-out counters.

24 Claims, 9 Drawing Sheets

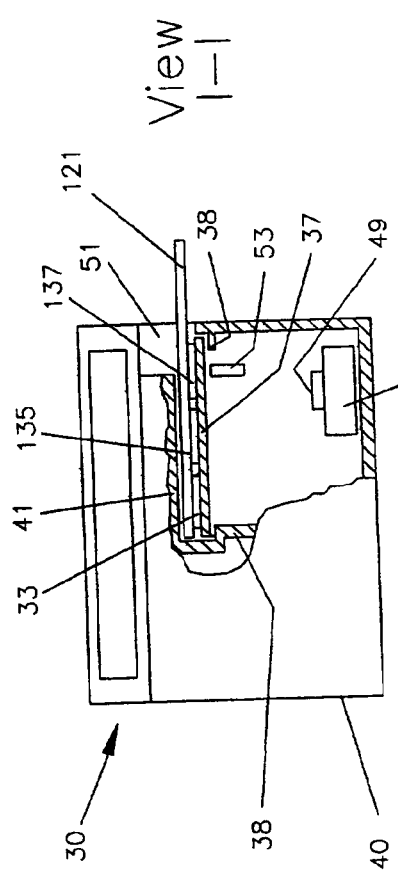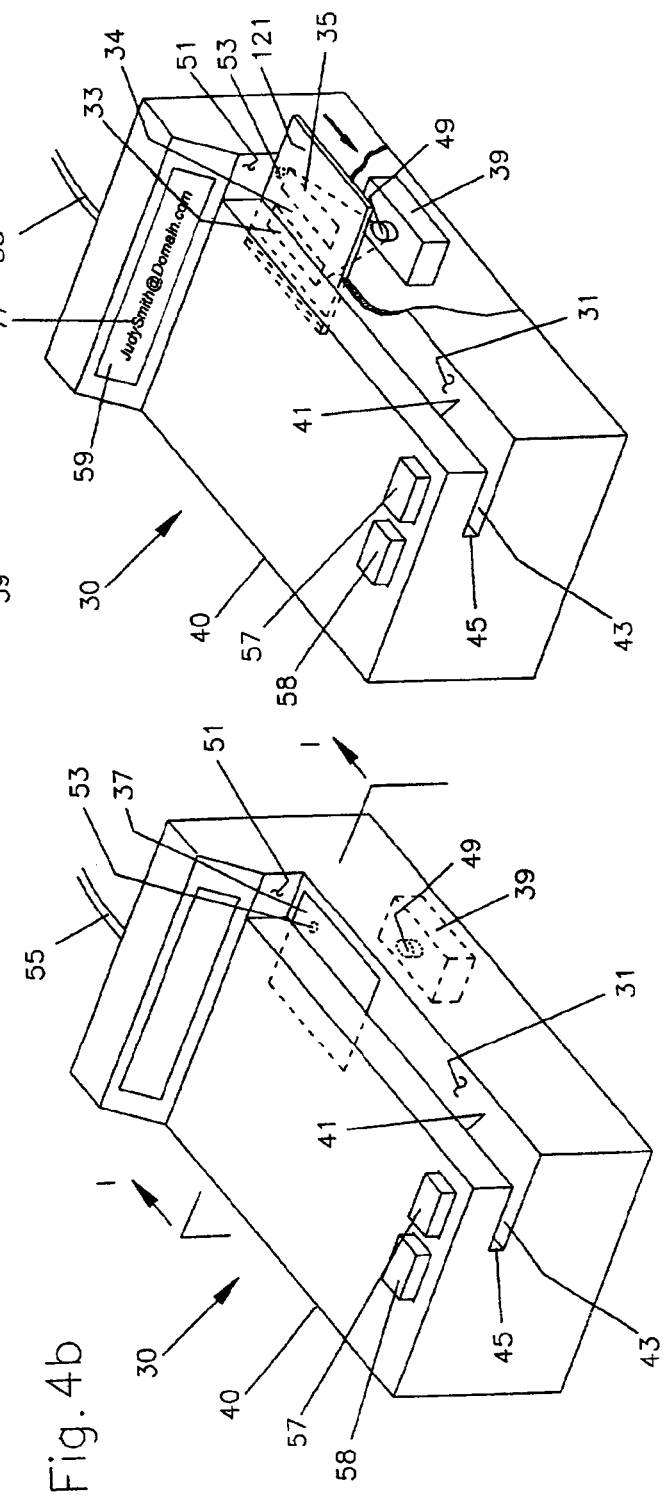

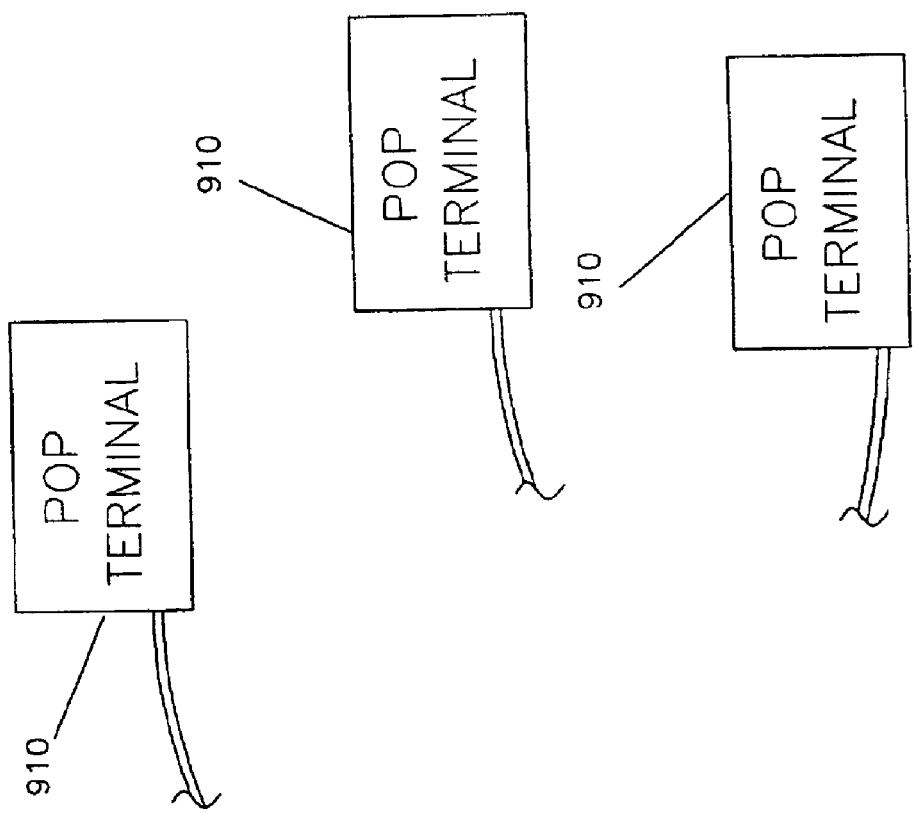
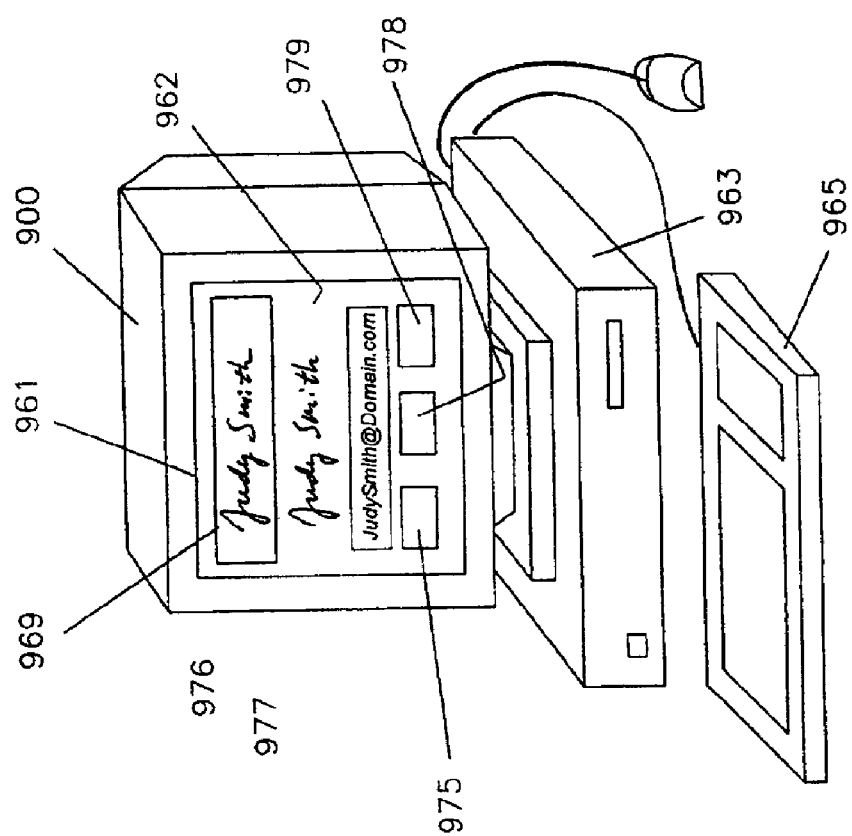
Fig. 9b

SYSTEM OF CENTRAL SIGNATURE VERIFICATIONS AND ELECTRONIC RECEIPT TRANSMISSIONS

BACKGROUND OF THE INVENTION

Credit cards are widely used for purchasing products and services. Conventionally, a credit card is swiped through a magnetic stripe reader connected to a point-of-purchase terminal. The magnetic stripe reader reads the customer's account information embedded in a magnetic stripe on the credit card and transmits the data of purchase transaction electronically to the credit card issuer's communication network for purchase authorization. The approval or rejection of the credit card purchase is electronically transmitted back to the point-of-purchase terminal. At the point-of-purchase terminal, a store clerk has the customer sign a paper receipt. The store clerk is required to verify the signature on the paper with respect to the signature on the backside of the credit card. However, signature verification is seldom performed for being intrusive and time consuming and it is neglected in the case of using self-service credit card readers, by which credit cards are swiped by credit card owners. Thus, a need exists for a computer-assisted signature verification system for preventing credit card frauds and eliminating physical handling a credit card by a store clerk for inspection. Such need is more pressing because of the growing use of self-service check-out counters in superstores where point-of-purchase terminals are not attended by store clerks. Consequently, it is imperative to have a central signature verification system for the remote authorization of credit card purchases at self-service check-out counters. Furthermore, in the environment of home computers and email systems there is a need for transmitting electronic receipts for enabling customers' book keeping on their home computers. For this purpose, conventionally an email address needs to be pre-registered with a store for transmission of electronic receipts. This requirement is undesirable as the use of the email address becomes out of the card owner's control that may result in unwanted commercial use and junk emails. Therefore, for privacy, personal control and efficiency, it is desirable to have a means of selective transmission of an electronic receipt which is controllable by an customer with automatic input of email address to the email system.

(1) Field of the Invention

The present invention relates to a system of credit card signature verification and electronic receipt transmission. The system involves the use of a credit-card, credit-card reader, digital camera, touch-pad input device, and software control programs interfacing with store database, electronic word processing system and an email system of a computer network.

(2) Related Art

In the prior art a number of patents address computer-assisted signature verification and use of electronic receipts. The methods disclosed heretofore do not adequately satisfy the needs of enforcing signature verification and the privacy of customers' email addresses. The prior art patents relevant to the objectives of the present invention are cited as follows:

U.S. Pat. No. 6,188,309 by Levine deals with the problems of fraud in credit card transactions by providing an intelligent credit card that includes a keypad, a microprocessor and a battery. When using the credit card, a user enters a PIN number on the keypad and only the correct PIN number can activate the credit card. Although the PIN number adds security, the reliability of the intelligent credit card is not ensured as the key pad is not fail-proof and the battery can be out of power. The intelligent credit card is useless when any such malfunction occurs.

Hand-written signatures are widely used for identification of a person due to the uniqueness of a person's signature. Signature characteristics used for comparisons include starting and ending points, strokes, inflections as well as intersection points. Automatic verification of a signature is extremely difficult because of large variation in a person's signature, even more so when signing at an unusual different pace or physical condition.

U.S. Pat. No. 5,559,895 by Lee et al. recognizes that a person's signature changes over time. It uses an adaptive method for signature verification by storing the latest genuine signature in the database. In a verification system the features of a signature are normalized with respect to both time and spatial dimensions; therefore, the information in the database is evolving. Applying to an automated operation, however, the method has a drawback as a current but non-representative signature may be stored and used for the next signature verification. This lack of a constant reference signature may result in confusion and verification errors.

U.S. Pat. No. 5,680,470 by Moussa et al. describes the process of digitizing a signature data and removing irrelevant features for comparing signatures. The signature data comprises a set of pixels in which each pixel has data structure in terms of X, Y coordinates, timing of pen-up/pen-down and related writing pressure. The system uses the normalization of template and test signatures for removing irrelevant factors. In view of the free form nature and inconsistency when writing a signature, it is unreliable for an automatic signature verification system to distinguish irrelevant features of a test signature from meaningful characteristics of a template signature. For a reliable signature verification, it is essential that the full strokes of the test signature and the template signature are displayed and compared.

U.S. Pat. No. 5,251,265 by Dohle et al. describes the process of digitizing a signature image with picture elements. The picture elements are pixels that form a three dimensional information space. In addition to the two dimensional X and Y coordinates, the gray-scale values (blackness) or the optical density is the third dimension of a pixel's properties. For signature verification, the blackness of every pixel which has a range of 256 gray-scale values between black and white is converted into two values, black or white. The conversion utilizes probability values and weighting factors related to the importance of physical factors in signing a signature. A major disadvantage of the probability approach is that a set of weighting factors suitable for describing a person's signature variation over time may not be applicable to other persons.

U.S. Pat. No. 4,985,928 by Campbell et al. relies on the measurement of the optical density of a test signature for comparison with that of a template signature. Because it relies on the optical density, the patent does not address possible errors due to the optical density variations of different types of pens and usage conditions when writing signatures. Also, the patent does not define a characteristic height of a signature for the size normalization.

Introducing the time factor in signing a signature, U.S. Pat. No. 5,828,772 by Kashi et al. discloses a verification method based on signals that represent the speed and direction of the stylus on a signature input device. The information stored is referred to as a stroke-direction code (SDC). The SDC of a signature is obtained by subdividing the signature into a sequence of line segments or a time-ordered array, which are referred to as links between discrete points along the signature. This time-related method is not applicable to the signature verification of a conventional credit card, as the credit card does not contain any SDC information of the template signature on the card.

U.S. Pat. No. 6,076,731 by Terrell describes a magnetic stripe reader using a stationary signature scanner and an electronic transaction system. The swiping action of a credit card provides for simultaneous reading of magnetically encoded data and scanning of an authorized (template) signature on the credit card. For signature verification, a customer inputs a signature on a touch screen or a digitizing tablet. Then the digitized signature is analyzed statistically and compared by stored software to determine the validity of the input (test) signature. Nevertheless, the scanned template signature is obtained by manually swiping the credit card against the stationary scanner by which the swiping motion is not controlled at a constant travel speed. Consequently, the scanned template signature is subject to image distortion due to the variation of swiping speed in the length of the template signature that may lead to verification errors.

U.S. Pat. No. 5,960,100 by Hargoove describes the use of two digital cameras for capturing a thumb print image for verifying the authenticity of a credit card owner. A first camera installed in a credit card reader scans the template thumb print image on the credit card and a second camera is used to scan a test thumb print of a card user. An image comparison mechanism compares the two captured thumb print images. Besides the disadvantage of using two cameras, the method as described does not lead to normalization of thumb print images because of the lack of well defined features in a thumb print for reference for achieving the same orientation and size. Besides, the inking of a user's thumb is an objectionable invasive action.

There is a prior art patent on the use of cameras for capturing signatures in packaging industrial applications. U.S. Pat. No. 5,992,753 by Xu describes the use of a modular camera assembly for generating a composite video signal representing an image of a target area that includes a signature. The imaging assembly has a two-dimensional photosensor array. Although the modular device of this invention captures the image of a signature, it does not distinguish and isolate the signature image from other images in the captured image area for signature normalization and verification.

In a typical purchase transaction, a customer signs his or her name on a receipt with a stylus or on a screen surface of a touch-pad device. A touch-pad device can detect local capacitance changes due to contact pressure. The touch-pad device is connected to a host computer system via a communication link that may include a telephone line, a network or Internet linkage.

A general capacitive-type touch-pad device applicable for signature input is described in U.S. Pat. No. 5,942,733 by Allen et al. The touch pad comprises a substrate material having conductive traces forming capacity sensors with the X direction disposed on a first face and the Y direction disposed on a second face of a compliant material. The compliant material is a sheet of elastic sheet that deforms under pressure and springs back to its original shape when released. A layer of pressure-conductive material is disposed over one of the substrate faces. A protective layer with a conductive coating on its back surface is disposed over the top surface of the pressure-conductive material for protection. When a stylus presses on the surface of a capacitive-type touch-pad sensor, the protective overlayer and compliant material will deform around the area of contact. This has the effect of depressing the conductive layer closer to the X and Y conductive traces of the sensor matrix. The closer proximity of the conductive layer will increase the capacitance measured by the sensor matrix as a contact signal. The magnitude of the contact signal is determined by the degree of the deformation around the stylus.

U.S. Pat. No. 6,002,389 by Kasser allows both touch and pressure gestures to be detected and converted. Instead of a foam-like or silicon-like material, a plurality of small air gaps are utilized for providing capacity variations in response to local contact pressures of a pen or a finger touch. The above two prior patents exemplify the skill in the art and the applicability of capacitive-type touch-pad devices for capturing signature input from pen or stylus contact.

Additionally, U.S. Pat. No. 6,193,152 by Fernando et al. describes a liquid crystal display ("LCD") that includes a pressure sensitive screen and display that can respond to contact pressure from a passive stylus or pen. A user can write a signature by using a stylus, and simultaneously see the as-written signature displayed on the device. The device includes a built-in three-stripe magnetic card reader. It can be used to conduct paperless transactions. The device enables the merchant to create a profile for each user to communicate purchase information to the user's own computer for accounting purposes. Although the display as described displays a signature on the LCD screen, it does not enable concurrent display of the as-written (test) signature with the (template) signature contained in the credit card for verification. Furthermore, the paperless transaction of this invention requires pre-registration of the email address with the credit card issuer such that the email address is embedded in the magnetic strip. This pre-registration requirement is objectionable to users who prefer privacy and nondisclosure of their email address for commercial use.

Also using a liquid crystal display, the signature verification system of U.S. Pat. No. 6,118,889 by Izuno et al. uses a dedicated pen having the function of applying static charge onto the liquid crystal sheet when writing a signature. After verifying this hand written coordinate information with that of the pre-registered signature, the handwritten signature shown in the liquid display sheet will disappear by itself after a predetermined period of time. The use of a dedicated pen is a severe limitation for this method and the feature of disappearing signature has no advantages compared to a paper receipt having a visible signed signature.

It is desirable to send an electronic receipt to a customer's personal computer via email. A typical electronic receipt includes purchase items along with their prices and grocery codes. U.S. Pat. No. 6,185,542 by Moran et al. describes the process of filling out required forms for pre-registration of an email address with the account number of a store's club card for transmitting purchase transaction data to the email address. When a store computer receives credit card information from a point-of-purchase (POP) terminal, it automatically transmits the transaction data to that email address. The method requires an email address be pre-registered with a closed computer network. Nevertheless, it is desirable to have an electronic receipt transmitted from any stores using an email system without pre-registering the email address. Furthermore, it is not desirable to manually enter the email address by the operator or the credit card user at the POP terminal as it is a time consuming practice.

U.S. Pat. No. 5,739,512 by Tognazzini describes general approaches of delivery of digital (electronic) receipts for travelers for the purpose of not keeping paper receipts. One approach is having a credit card issuer encode an email address on the magnetic stripe of the credit card for enabling purchase receipts to be sent electronically. Alternatively, a smart card is used when electronically signing on a digital receipt and when loading the digital receipt electrically into the smart card. The loaded information on the smart card can be accessed from an appropriate card reader or computer. The loaded information is sent to the credit card issuer when storing the digital receipt to the database, and when using the email address stored in the smart card to send the receipt electronically. The use of a smart card requires an established system protocol for identifying the email address. The user still needs to be verified as the owner of the smart card and the verification process is not addressed by said patent. Additionally, a smart card containing broad-based information is undesirable, as disclosure of one type of information (in credit card use) does not prevent disclosure of other information (such as other bank account data) when the smart card is being processed in a computerized device.

When using an email address for sending electronic receipts, the present invention uses an email address recognition system that reads the email address printed on a label stripe which is attached to the backside of a credit card like the signature label stripe on a conventional credit card. It uses an integrated optical character recognition (OCR) system to identify the signature and the characters of the email address. Then the identified email address is entered to the communication system of a computer network. There are prior art patents that deal with different optical character recognition systems. However, none of the prior art patents are adequately applicable to the need of identifying the email address printed on a credit card.

A typical optical character recognition (OCR) system is provided by U.S. Pat. No. 5,091,968 by Higgins et al. for optically identifying an alphanumeric character on a document. The method comprises the steps of determining a matrix of gray-scale values and X, Y coordinates of pixels, converting the matrix values to binary data, and identifying the test characters by matching the converted binary data with the predetermined binary patterns of the template characters. The OCR system locates and frames each of the characters by searching the stored data for a rise in gray-scale value representing a transition from a light pixel to a dark pixel, vertically from bottom to top along the scan line. When a dark pixel is found, the system checks the character region (the stored data proximate to the dark pixel value) to determine if the dark pixel is part of a character. It checks for the frame size of a character by establishing a segmentation window of sufficient size to frame the character on the document effectively. By means of the segmentation window, a matrix of pixel values most representative of the character is framed. For identifying the next test character, the OCR system proceeds to the next group of stored pixel values representing the region on the document proximate to the proceeding framed character. By the same process the test character in this proximate region is framed and identified. All of the remaining test characters (remaining stored pixel data) are processed in this manner until the end-of-field is detected. However, the optical character recognition of the above invention does not use a normalization process for equating the size and alignment of a test character for ensuring the best match with a template character. Neither feedback means is provided for the correction of the identified characters.

For improving the speed and accuracy of an automatic OCR system, U.S. Pat. No. 5,933,531 by Lorie employs context analysis and operator input on an as-needed basis for error corrections. After character recognition, the context analyzer processes the fields of test characters and evaluates the results of identified contexts of characters which may not be completely recognized. Based on established guidelines and a predetermined level of confidence as criteria, the steps for user-assisted verification and correction may be simplified and omitted to shorten the correction process. However, the process of less than 100% confidence level can lead to errors in identifying the email address. Without the exact correct email address, the email system of the computer network cannot deliver the email to the customer.

Despite the prior art on signature verification and electronic receipts, there has been no system that addresses the need of enforcing signature verification and the selectivity of receiving an electronic receipt. Therefore, it is the objective of the present invention to provide a means of signature verification without physically handling a customer's credit card by a store clerk. It is another objective to provide a means of selectively transmitting an electronic receipt without requiring pre-registering a customer's email address.

SUMMARY OF INVENTION

For enabling remote central signature verification, the electronic receipt system of this invention uses a credit card reader having a built-in digital camera for capturing template signature and email address images printed on a credit card. The credit card reader has a glass platen and an optical sensor for registering and detecting a credit card and actuating the digital camera. The characters of the email address are identified by an optical character recognition (OCR) program and the email address is input to the email system for sending an electronic receipt to the card owner. For signature verification, a test signature is entered on a touch-pad input device and transmitted to the display of a host computer. Both the template and the test signatures are normalized with angular adjustment for equalizing their sizes for the convenience of visual inspection. For enforcing the signature verification, three action buttons are provided on the display screen for the store clerk to respond: one for approval of the test signature, one for repeat of the test signature, and another for rejection of the credit card purchase. These computer-assisted features eliminate the need of physical handling the credit card for signature verification and manual input of the email address. By means of having an email address printed on the credit card and using an OCR program, the present invention eliminates the need of pre-registration of an email address for the transmission of electronic receipts.

The process of optical character recognition for identifying the email address utilizes the same process of normalizing a test signature. To ensure error-free input of the email address for transmitting an electronic receipt, the email address as identified by the OCR is displayed for error corrections. For applications in self-service check-out counters, a number of point-of-purchase (POP) terminals are connected to a central host computer system which has a queue control program in its operating system. Each POP terminal consists of a credit card reader having a digital camera and a touch pad for transmitting captured pixel data of signatures and email address to the central host computer system having a monitor with a display. The signature verification and the email address identification are performed by the central host computer system. And the central computer system provides feedback to a POP terminal in process through the three action buttons which are selectively actuated by the operator of the monitor depending on the result of the inspection. The credit card's transaction is not proceeded for authorization without the approval of the test signature.

BRIEF DESCRIPTION OF THE DRAWINGS

FIG. 4a is a cross-sectional front view of a credit card reader having a digital camera aiming at the targeted imaging area of a credit card.

FIG. 4b is a prospective view of a credit card reader of FIG. 4a showing the position of a registration glass platen.

FIG. 4c is a cut-out view of a credit card reader of FIG. 4a showing a display of email address after actuation of the digital camera.

FIG. 9b is an illustration of a central signature verification system.

DETAILED DESCRIPTION OF THE INVENTION

Conventionally, a credit card is used for purchase transactions at a cash register or at a point-of-purchase terminal. A test signature is signed directly on a paper receipt or entered on a touch-pad input device and transmitted to a terminal printer to print on a paper receipt. A cashier is required handling the credit card for inspecting the test signature signed on the receipt in comparison with the template signature signed on the credit card. In the electronic receipt system of present invention, the signature verification is performed without manually handling the credit card by a cashier as described below.

Figure 1:
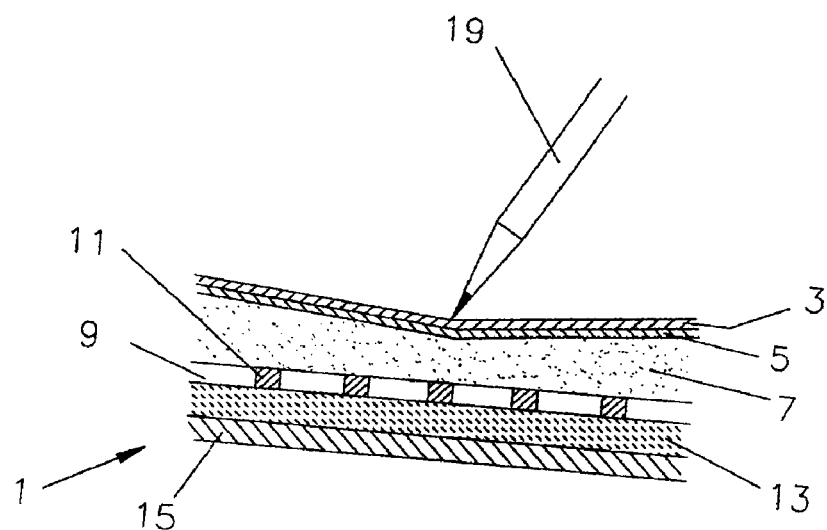
FIG. 1 is a cross-sectional side view of a touch pad for signature input.

FIG. 1 shows touch pad 1 which is preferably capacitive-type. A capacitive-type touch pad comprises an insulating layer 13 having an orthogonal matrix of first parallel conductive traces 11 aligned in the X-direction disposed on a first surface, and second parallel conductive traces 15 aligned in the Y-direction disposed on an opposed second surface. The conductive traces 11 are covered by a foam-type compliance layer 7 and a thin conductive material 5. On top of the conductive material 5 is an external protective layer 3. The external protective layer 3 is an insulative and flexible material, such as a Mylar (trade name) sheet. Upon contact by a pen 19, its local displacement or compression changes the distance between the conductive traces and a ground plane that changes the local capacitance. Preferably, air gaps 9 are used in the matrix of conductive traces. The local compression of the insulating layer 13 expels the air in the local area that results in the change of local capacitance accordingly. Touch sensing circuits are capable of detecting capacitance variations on the order of one percent. The structure and function of a touch pad for signature input is well known in the art.

Figure 2:
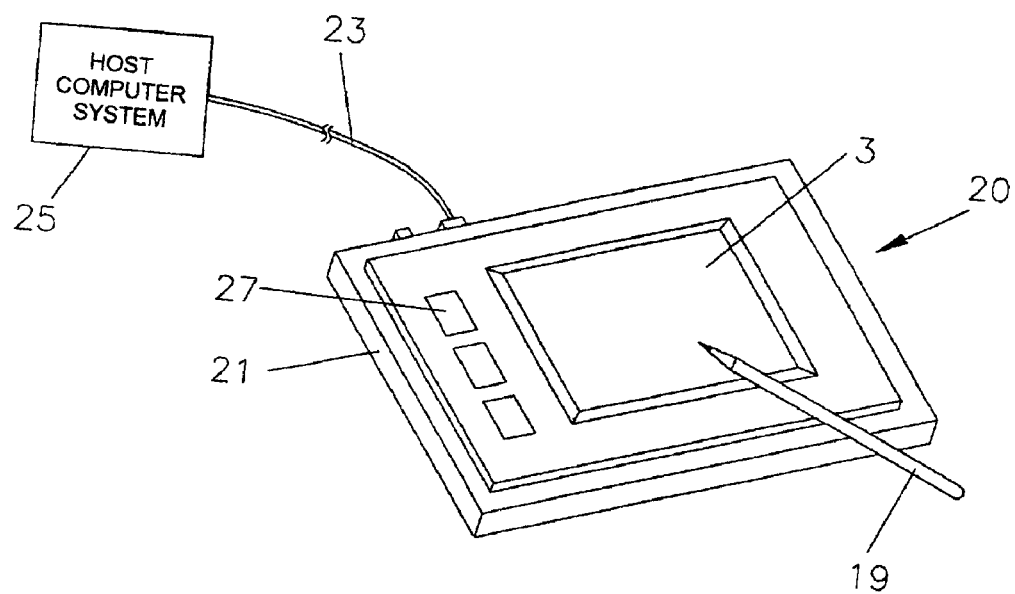
FIG. 2 is a perspective illustration of a touch-pad input device connected to a host computer system.

FIG. 2 depicts a credit card signature verification system which comprises a touch-pad input device 20 connected to host computer system 25. Touch-pad input device 20 comprises housing 21, touch pad 1, feedback indicator 27 and communication link 23 which is connected to host computer system 25. Host computer system 25 includes a processor having CPU, a credit card reader and an operating system software. This host computer system 25 is also equipped with a display, keyboard and mouse and its operating system is connected to a computer network system which is in communication with credit card issuer's communication network and the Internet. In this embodiment, a touch-pad input device, a credit card reader or a host computer may individually or collectively have signature verification and optical character recognition programs (to be described in later sections) as well as network communication software. When using the electronic receipt system of this invention, an electronic receipt is entered with the customer's signature and sent to the customer's email address. For preserving a credit card owner's privacy, the electronic receipt of this invention does not require pre-registration of a card owner's email address with the card issuer. To enable this capability, a credit card of this invention has a label stripe containing a printed email address. The email address is added by the card owner, similar to the signing of the card owner's signature on the credit card.

Figure 3A:
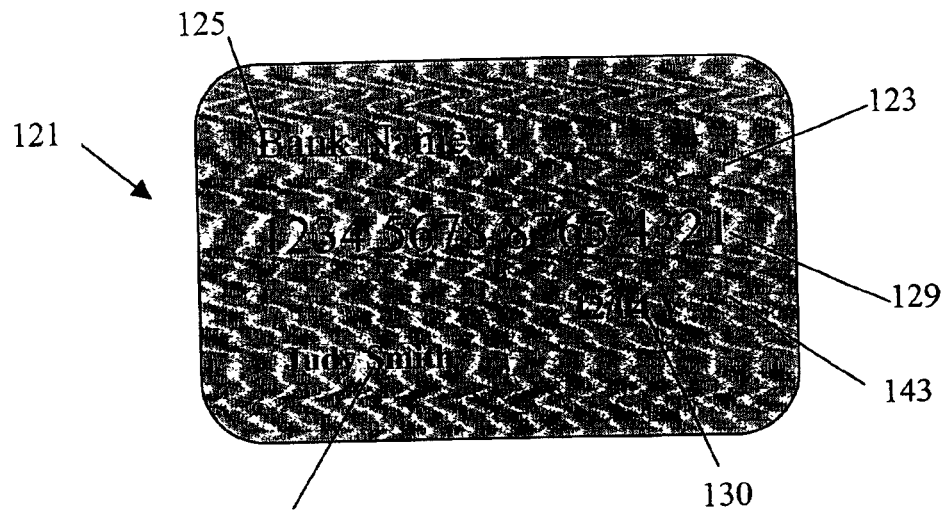
FIG. 3a is a front view of a first (front) surface of a credit card.
Figure 3B:
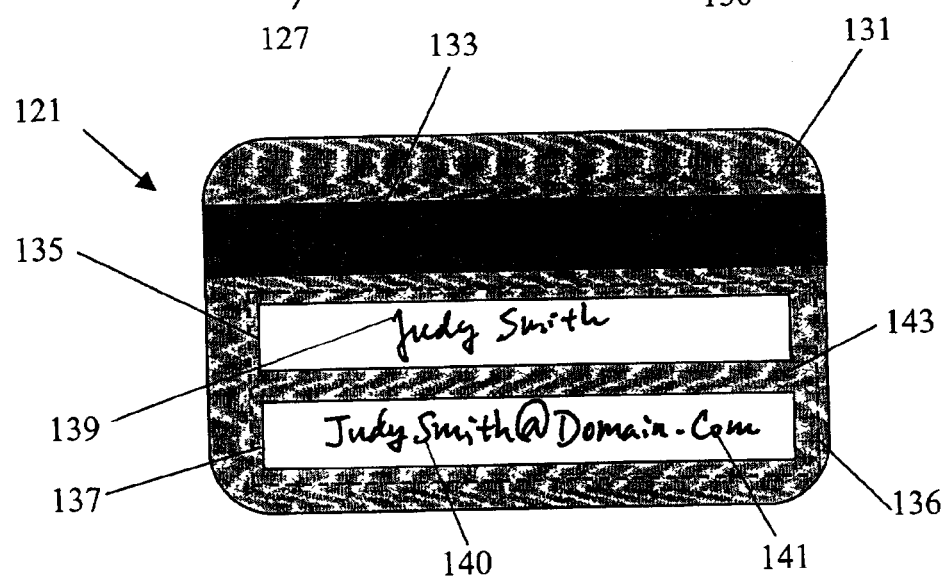
FIG. 3b is a front view of a second (back) surface of a credit card having the first label stripe and the second label stripe.

FIGS. 3a, and 3b show credit card 121 having a first (front) surface 123 and a second (back) surface 131, with the first surface having an account number 129, expiration date 130, issuer name 125 and owner name 127. The second surface 131 has a thin magnetic stripe 133 with account number 129 embedded thereon, and two label stripes which contain a signature and an email address separately. The account number is typically embossed on the first surface and encoded in the magnetic stripe on the second surface of the credit card. The background material 143 of the second surface 131 has a range of optical density which is denoted by $D_B$. FIG. 3b shows a first label stripe 135 and a second label stripe 137. The first label stripe 135 contains template signature 139 of a credit card owner to whom the account number 129 is assigned. The second label stripe 137 contains email address 141 of the card owner to which an electronic receipt (statement of purchase transaction) will be sent to via an email system or via the Internet. Typically the first label stripe 135 is positioned immediately next to and below the magnetic stripe 133. The second label stripe 137 is immediately positioned next to and below the first label stripe 135. These two label stripes are separated by the background material 143 of the second surface 131 of the credit card 121. The range of the optical density of the two label strips 135 and 137, which is denoted by $D_L$, is distinctly different from that of the optical density, $D_B$, of the background material 143 of the credit card 121.

Figure 3C:
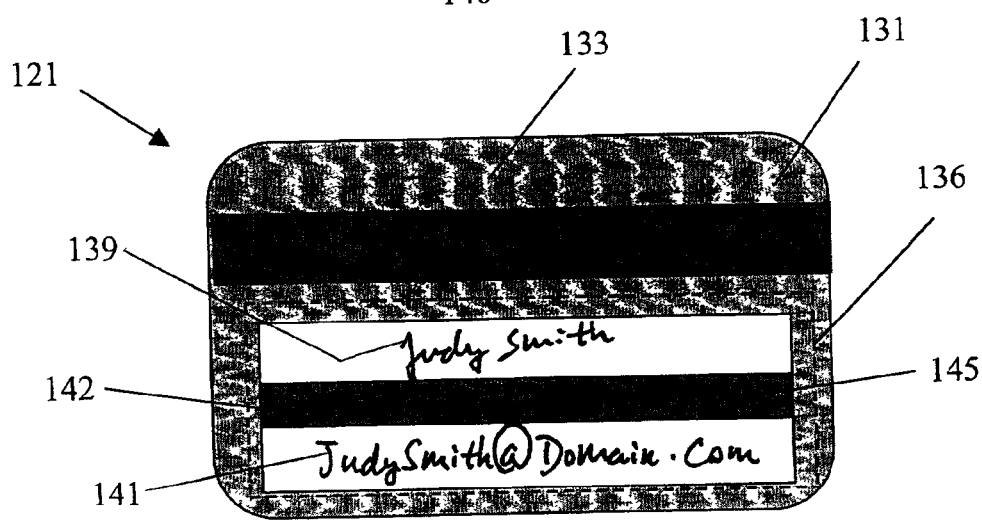
FIG. 3c is a front view of a second (back) surface of a credit card having a single wide label stripe having the template signature and the email address separated by a demarcation band.

Typically the first label stripe 135 is attached on credit card 121 when issued by a credit card issuer for signing a template signature 139. The second label stripe 137 can be attached by the card owner or provided by the credit card issuer for printing on an email address 141. Alternatively, as shown in FIG. 3c, a template signature 139 and an email address 141 are entered on a single wide imaging label 142 attached to the second side 131 of the credit card 121. In this case the wide imaging label 142 is divided by a marked demarcation band 145 into two imaging zones, one for the template signature 139 and another for email address 141. Physically, the first and the second label stripes are of narrow rectangular shape and their positions can be predefined. In the art of image processing, the areas of the signature label stripe and the email address label stripe can be well identified from the background optical density of the second surface of a credit card or from a predetermined geometric relationship.

The credit card having the signature and email address label stripes is to be read by a credit card reader having a built-in digital camera. FIGS. 4a, 4b, and 4c show a credit card reader 30 of this invention comprising of housing 40, magnetic stripe reader 31, integrated digital camera 39, second display 59, a processor (not shown), stored control programs (not shown), and communication link 55 which is connected to an electronic transaction system. As will be described later, the objective of digital camera 39 is to capture digital images of the signature and email address for signature verification and email address identification. With this camera-assisted computer system, there is no need of physical handling of the credit card for verification by a store clerk.

The housing 40 of a credit card reader contains a card slot 43 for swiping the credit card 121 and a registration glass platen 37 at the inboard-end 51 of the card slot for positioning the credit card. Card slot 43 has a first surface and a second surface. Located on the side of the second surface are a registration glass platen at the inboard-end 51 of the card slot 43 and a magnetic stripe reader 31 positioned downstream of the glass platen. The registration glass platen 37 is supported by ribs 38 of the housing 40. An optical sensor 53, which is a light emitting diode, is positioned near the inboard-end 51 below the registration glass platen 37 for detecting the presence of a credit card. On the same side as the second surface of card slot 43 and directly under the glass platen 37 is a digital camera 39 with a wide angle lens 49 facing the glass platen. For processing, a credit card 121 is registered at the inboard-end of card slot 43 with the second side of the credit card facing the glass platen. Upon detecting the presence of a credit card 121 which is registered and held stationary against the inboard-end guide 51 and the side guide 45 of the card slot 43, digital camera 39 captures the image area 136 (see FIG. 3) of the first and second label stripes which contains the signature and the email address respectively. Since both the digital camera and the credit card are stationary without relative motion during the picture taking, the image of the signature is not distorted. Following the image capturing, credit card 121 is swiped through card slot 43 against the side guide 45. The swiping action enables reading of the magnetic stripe 133 by a magnetic stripe reader (not shown), which is positioned on the side of the second surface of the card slot. The account number and other information contained in the magnetic stripe are then processed by the stored software programs and entered into the electronic transaction system, which is in communication with the card issuer's credit card communication system for authorization. The detailed mechanism and functions of the magnetic stripe reader as well as the electronic transaction system are well known in the art. Prior to the credit card authorization, the signature verification and the email address identification steps are to be completed. These two processes are accomplished by using the captured images of the signature and the email address provided by the digital camera.

The digital camera 39 has a charge coupled device (CCD) having a two dimensional photosensor array, an optic assembly which includes preferably a wide angle lens for focusing on the image area and an illumination assembly providing targeted illumination to image area 136 of credit card 121. The digital camera 39 is adapted to capture the image area 136 upon an activation signal. As described previously, the activation signal is provided by the optical sensor positioned below the registration glass platen. A method of automated signature verification includes the steps of storing the template signature, entering a test signature, signature normalization, comparison, and the final decision step. The digitized image of the targeted image area contains a number of picture pixels with each pixel having a three-dimensional information space. An image pixel of a signature has a two-dimensional array representing X and Y coordinates and the third dimension indicating the blackness of the pixel. The blackness of each pixel is represented by three ranges of optical density which are out of 256 gray-scale values between black and white. The first range of optical density, $D_B$, includes the optical density of the background material of the second side of the credit card. The second range of optical density includes the background density, $D_L$, of the first and the second label stripes. The third range of optical density, $D_S$, includes the optical density of the signature and email address, which are preferably presented in dark pixels. Referring to FIG. 3c, first label stripe 135' and second label stripe 137' are separated by a demarcation band 145 (physically it may be the background material 143 of the second side of the credit card 121) whose optical density is in the range of the background density, $D_B$, of the credit card. The dark pixels generally have a greater gray-scale value (approaching 255), and the light pixels generally have a lesser gray-scale value (approaching 0). An optical pattern recognition program detects the three ranges of the optical density so as to exclude pixel data outside the first and the second label stripes. By comparing the gray values of all the pixels inside the first and the second label stripes to a threshold value, the optical pattern recognition program further obtains a binary quantification of the pixel patterns in black/white or in "zeros" and "ones" for identifying the signature and the characters of the email address.

In the aforementioned classification of pixel optical density, the first label stripe area contains dark pixels 134 which are part of the template signature. In general, the template signature entered by the credit card owner on the first label stripe may not be totally aligned with the neutral axis of the first label stripe. For signature comparison, the orientations of both the template signature and a test signature should have the same alignment with respect to a common horizontal datum line and the signatures should be compared at the same size. As will be described later, global orientation and global height of the template signature are derived for normalizing a test signature for verification.

Figure 5B:
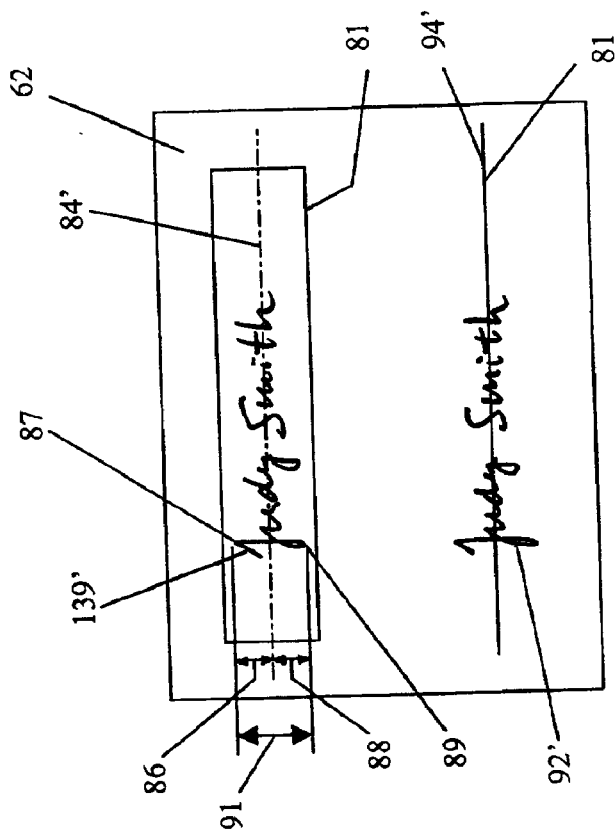
FIG. 5b is an illustration of rotated and normalized template and test signatures having horizontal orientation.
Figure 5A:
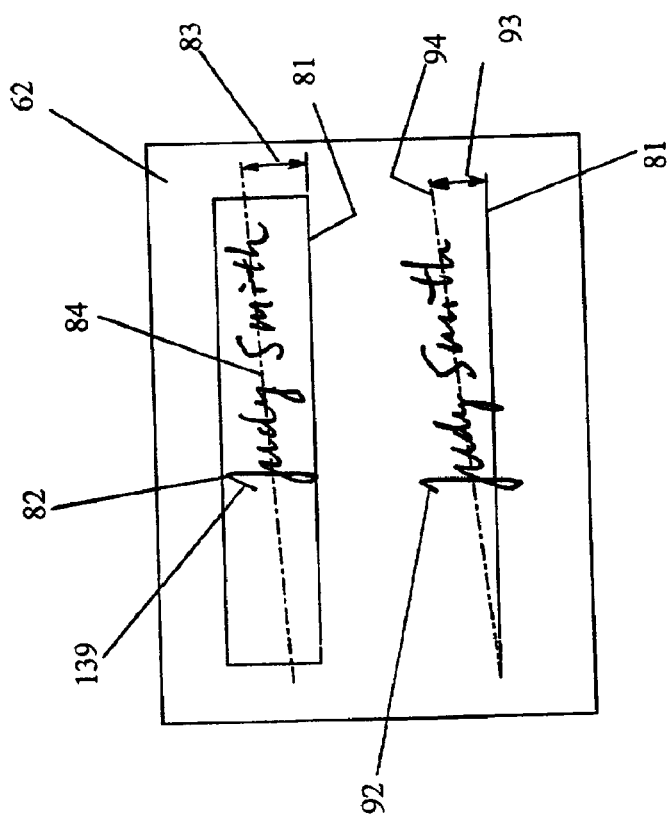
FIG. 5a is an illustration of a template signature and a test signature prior to the normalization process.

For determining a global angle or orientation of the template signature, the X and Y coordinates of all the dark signature pixels are used as input data for a linear regression analysis. The linear regression analysis using known statistical formulae determines central line 84 with the best-fit slope of the signature pixels 82 as the original global angle 83 of the template signature 139 as shown in FIG. 5a. For normalization, the template signature 139 is rotated against the original global angle 83 such that the final global angle of central line 84' is zero with respect to horizontal datum line 81 as shown in FIG. 5b. Thus, the rotated template signature has the horizontal orientation and the new X and Y positions of the signature pixels can be calculated according to known geometric formulae. With respect to the horizontal orientation, a size normalization is performed by determining the global amplitude of the rotated template signature. The global amplitude 91 is the absolute sum of the positive height 86 of the highest positive inflection point 87 and the negative height 88 of the lowest negative inflection point 89 of the rotated template signature 139'. The two extreme inflection points for defining the global amplitude for size normalization are used due to the fact that the writing of the inflection points are constrained while the end of a signature is of free form and non-constrained which may lead to inconsistent length. Similarly, the original global angle 93 of central line 94 of test signature 92 is determined by linear regression analysis, and the test signature 92 is rotated to have the horizontal orientation (i.e. zero global angle). Accordingly, new X and Y coordinates of the rotated test signature 92' are computed. Subsequently, the global amplitude of the rotated test signature is determined by the same process defined for the rotated template signature. As a result, the ratio R of the global amplitudes of the template signature to a test signature is used as a scaling factor for normalizing the size of the test signature. Using the ratio R, new X and Y coordinates of normalized test signature can be computed by using known geometric formulae. FIG. 5b shows a display of normalized template signature 139' and normalized test signature 92' having central line 94' oriented with the horizontal line 81.

The next step is the process of identifying the email address contained in the second label stripe on the credit card. The second label stripe area contains dark pixels 140 (shown in FIG. 3b) of the email address 141. An optical character recognition (OCR) program is used for recognizing characters of the email address. The process of identifying a character is similar to the process of signature verification, which involves angular adjustment and size normalization for each framed character. After identifying the email address, the host computer and computer network system transmits the electronic receipt to the customer's email address via an email system.

Referring to the previous classification of pixel optical density, the dark pixels of the second label stripe area are considered part of the email address. Preferably, the email address is entered in typed characters that can be more reliably recognized by an OCR program. For a handwritten email address, each printed character needs to be treated like a test signature for comparison with a template signature. As will be described later, global angle and global amplitude of each test character are obtained for normalizing a test character for comparison with template characters for identifying the test character.

To identify the first test character, a vertical single pixel line is started as the first test character frame. With the input of the stored pixel values, an OCR program proceeds to frame a first test character by scanning from the left end of the field (of the second label stripe) toward the right end of the field. It searches the stored pixel data vertically from bottom to top along the scan line for the optical density range $D_S$, which are dark pixels to be included for identifying with template characters which are used to form an email address.

The first test character frame increases in size in the direction where the coverage area of dark pixels increases. This operation is repeated until the final frame is reached, by which further increase of frame size in any direction does not increase the coverage area of dark pixels. In this final frame of pixel pattern, the framed test character is centered in the frame. The resultant matrix of pixel values of the framed test character needs to be normalized for orientation and size in order to compare with candidate template characters for identifying the framed test character. The normalization process of the test character is similar to that of a test signature as described previously. The linear regression analysis determines the global angle of the test character. After rotating the test character to the horizontal orientation, the global amplitude of the test character is determined for size normalization. Consequently, new X and Y coordinates of the matrix of dark pixels representing the test character are calculated based on known geometric formulae. Then the representative pixel matrix is used to find the best match with the representative matrices of candidate template characters. The template character that presents the best match is identified as the character for the test character.

After identifying the first framed test character, the OCR program proceeds to process the next character by establishing the second frame of single pixel line next to the first character frame. By the same process, the final frame of the second test character is determined. The normalization process is followed such that the template character that presents the best match is identified as the character for the second test character. All the remaining characters in the second label stripe are processed in this manner. Consequently the email address is identified by the OCR program.

For ensuring the correct email address, the characters of the email address as identified by the OCR program needs to be verified or corrected. A means for operator or card owner intervention on an as-needed basis is provided by having a display available for viewing by the customer (credit card owner) and by the operator of the credit card reader system. FIG. 4c shows a built-in second display 59 on a credit card reader, which shows the customer the characters of the email address identified 77 by the OCR program. The same email address is also shown on the display of the host computer facing the operator. After being verified or corrected manually by using a keyboard input, the correct email address may be confirmed by the customer by pushing an approval button 57 (shown in FIGS. 4b, 4c) on the credit card reader. The email address is then entered into the computer's email system by the control program. Optionally, a credit card owner may opt-out the emailing of an electronic receipt by actuating an opt-out button 58 on the credit card reader for not transmitting the purchase receipt to the email address. The opt-out button is in communication with the control program. This opt-out option feature is provided for a customer to choose and receive only electronic receipts of interest.

Although the entire email address can be entered by the card owner through using a keyboard, the email address captured by the digital camera and transmitted automatically by the method of the present invention eliminates manual operations and shortens the transaction time. A control program of the microprocessor , which is in communication with the OCR program and the email system, uses the verified email address to send the electronic receipt to the customer via an email. Transmitting an electronic mail to the email address through an email server via an Internet provider and the Internet is well known in the art.

Figure 6:
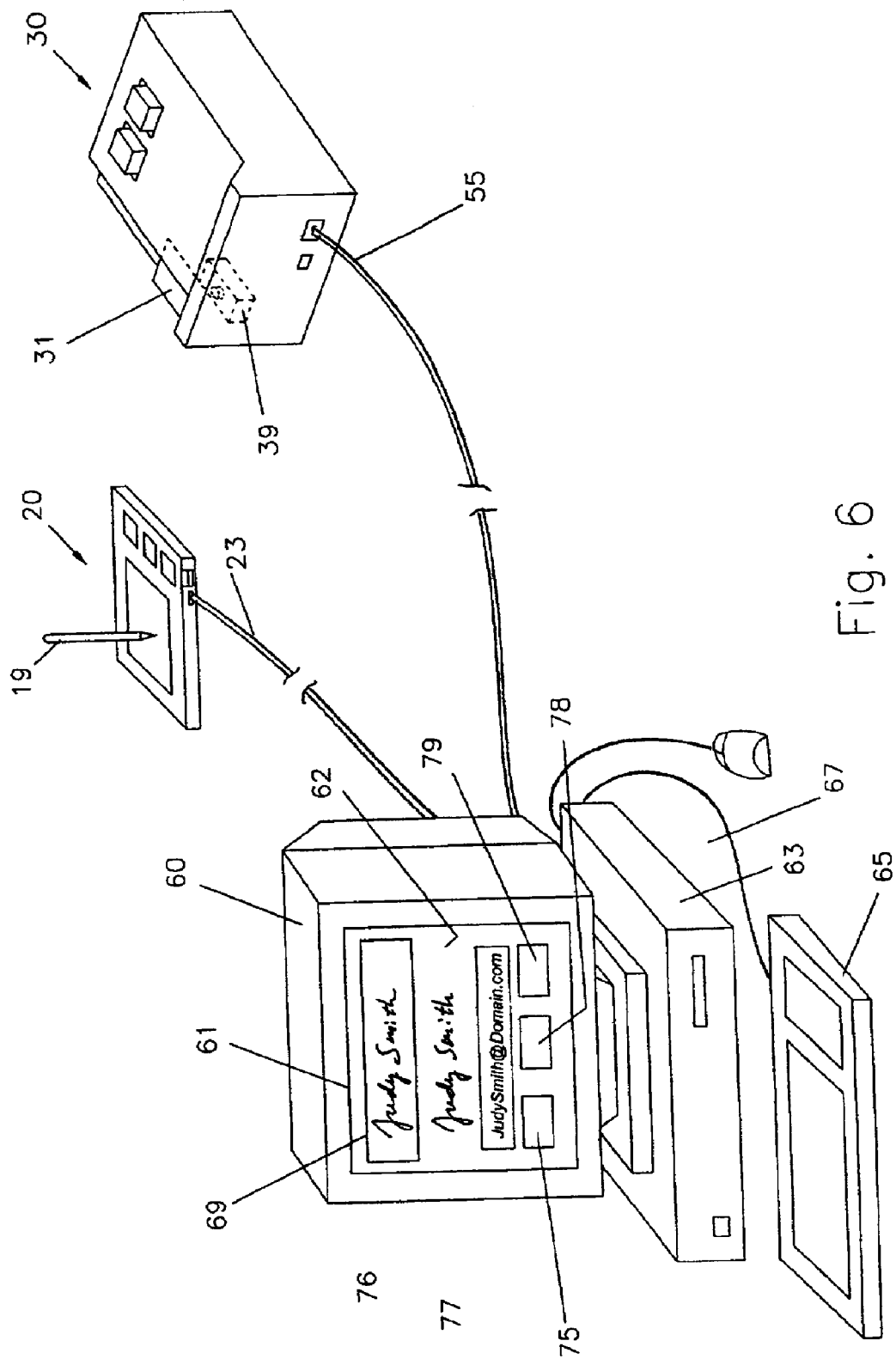
FIG. 6 is a perspective illustration of the display of normalized template signature, test signature, and three action buttons.
Figure 7:
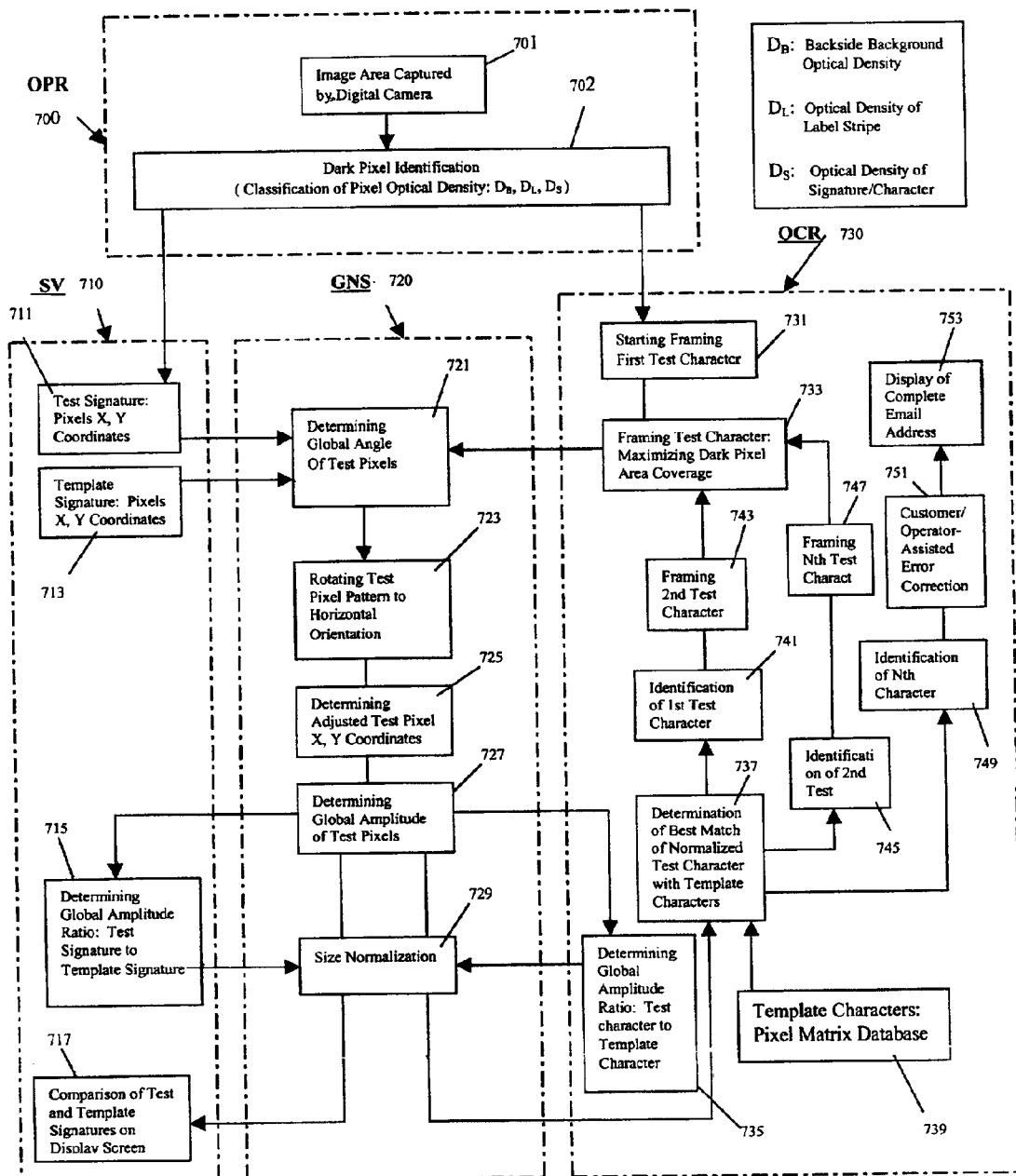
FIG. 7 is a flow chart showing the process of the signature verification and the email address identification.

The final approval for the credit card transaction requires the actuation of an approval-button. In a preferred embodiment, as shown in FIG. 6, display screen 62 of monitor 60 displays an approval-button 75, a request-button 78 and a rejection-button 79 for a store cashier operator to actuate after inspecting the signatures. Monitor 60 with first display 61, processor 63, keyboard 65, touch-pad input device 20, and credit card reader 30 are connected to the computer network system which is in communication with a credit card issuer's communication network. The three action buttons are positioned beside the display of the normalized template signature 69, normalized test signature 76 and identified email address 77. Each of the three buttons is actuated by a click with the mouse (point-device) of the computer or a push on the selected button displayed on a touch display screen. The approval-button 75 is for activating the authorization process for the approval of the credit card purchase transaction. The request-button 78 is in communication with a feedback indicator 27 (see FIG. 2) in a touch-pad input device 20 or in a credit card reader for signaling the credit card owner to re-enter a test signature for re-verification. The rejection-button 79 is for alerting a possible fraudulent use of the credit card. The foregoing description of the signature verification and email address identification process is summarized in the block diagram in FIG. 7. Referring to FIG. 7, the process of signature verification and email address identification comprises: (1) the process of optical pattern recognition (OPR) performed by an OPR program 700; (2) the process of generic normalization (GN) performed by an GN program 720; (3) the process of signature verification (SV) performed by an SV program 710; and the process of the optical character recognition (OCR) performed by an OCR program 730. The OPR program 700 comprises the steps of image area capturing 701 by the digital camera and dark pixel identification 702. The OPR program distinguishes three gray-level ranges: $D_B$ for the background of the back surface of the credit card, $D_L$ for the first and the second label stripes, and $D_{SC}$ for the signature and characters of the email address. The identified dark pixels are input to SV program 710 and OCR program 730. The SV program 710 comprises the steps of providing X, Y coordinates of the template signature pixels 713 and the test signature pixels 711 to the GN program 720, determining global amplitude ratio 715, and comparing test signature and template signatures 717. The GN program 720 is a generic program comprising the steps of determining the global angle 721, rotating test pixel pattern 723 and determining adjusted X, Y coordinates 725 and resultant global amplitude 727, and size normalization 729. For identifying the email address, the OCR program 730 comprises: (1) the steps of framing the first test character 731 by maximizing dark pixel area coverage 733, determining global amplitude ratio 735 for size normalization 729 for matching normalized test character 737 with template characters 739, and identifying the first character 741, (2) the steps of framing 743 and identification of the second test character 745, (3) the step of framing 747 and identification of Nth test character 749, (4) the step of manual error correction 751, and (5) the display of the complete email address 753.

Figure 8:
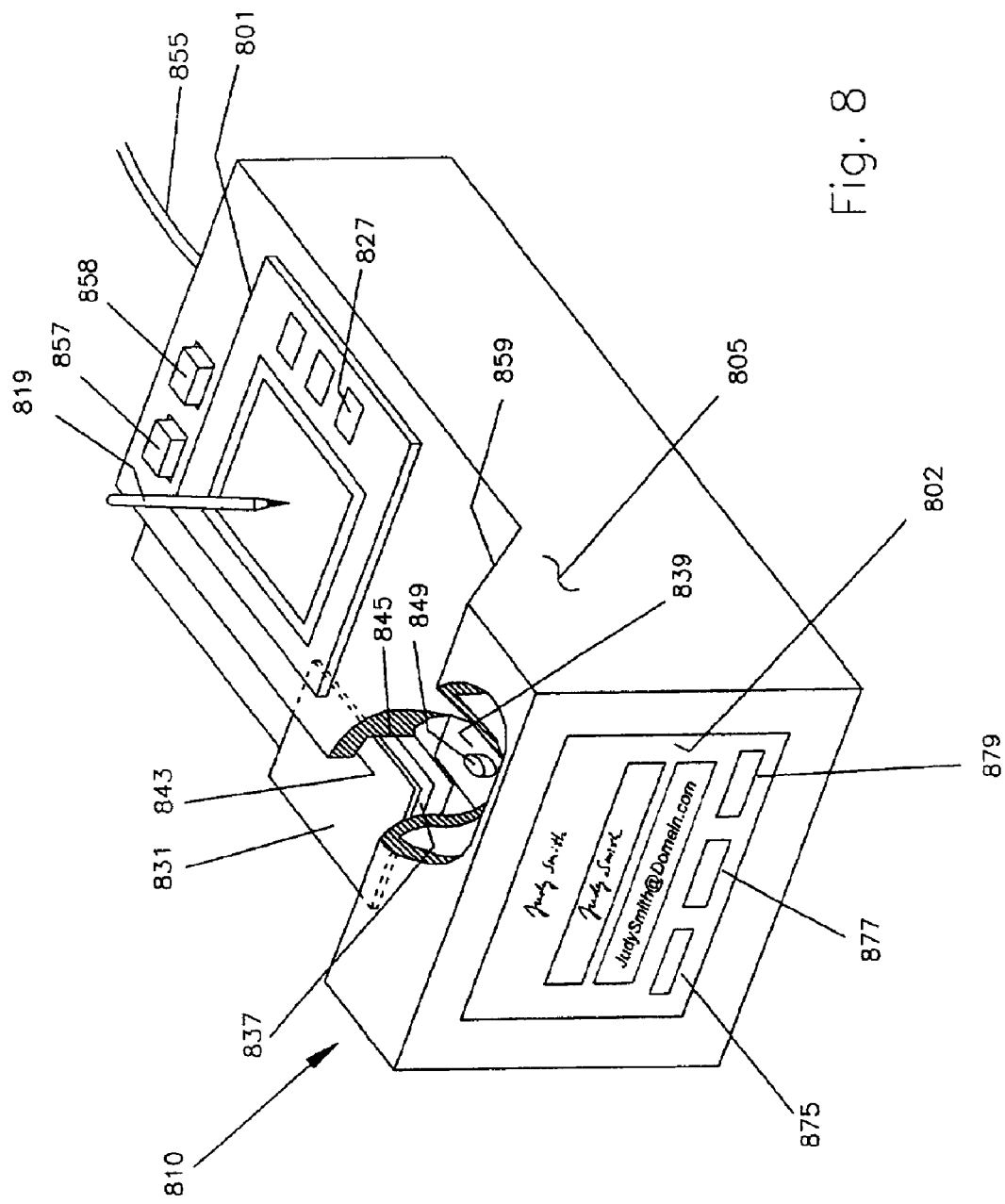
FIG. 8 is an illustration of a multi-function credit card processing device.

It is advantageous to combine the functions of a touch-pad input device, a credit card reader with a built-in digital camera, and a host computer into a multi-function (all-in-one) credit card processing device for signature verification and transmitting an electronic receipt. Such a multifunction credit card processing device may be placed at each check-out counter to save space. FIG. 8 shows a multi-function credit card processing device 810. Multi-function credit card processing device 810 has housing 805 that supports card slot 843 having side guide 845, registration glass platen 837, a magnetic stripe reader (not shown), digital camera 839 having lens 849, touch pad 801, first display 802 and second display 859 (as shown in second display 59 in FIG. 4b), email approval button 857, opt-out button 858, a microprocessor (not shown), stored control programs (not shown), and communication link 855. The configurations and functions of card slot, glass platen, magnetic stripe reader, digital camera, second display, microprocessor and store programs are the same as those described in FIGS. 4a, 4b and 4c. The configuration and function of the touch pad are the same as those described in FIG. 2. Also, the configuration and function of the first display are the same as those described in FIG. 6. In such a all-in-one multi-function device, first display 802 and second display 859 are supported in the same housing but facing in opposite directions. The second display that displays an email address faces the touch pad and actuation for confirming the accuracy of the email address. The second display also optionally displays the purchase transactions for viewing by the customer whose credit card is being processed by the credit card processing device.

Figure 9A:
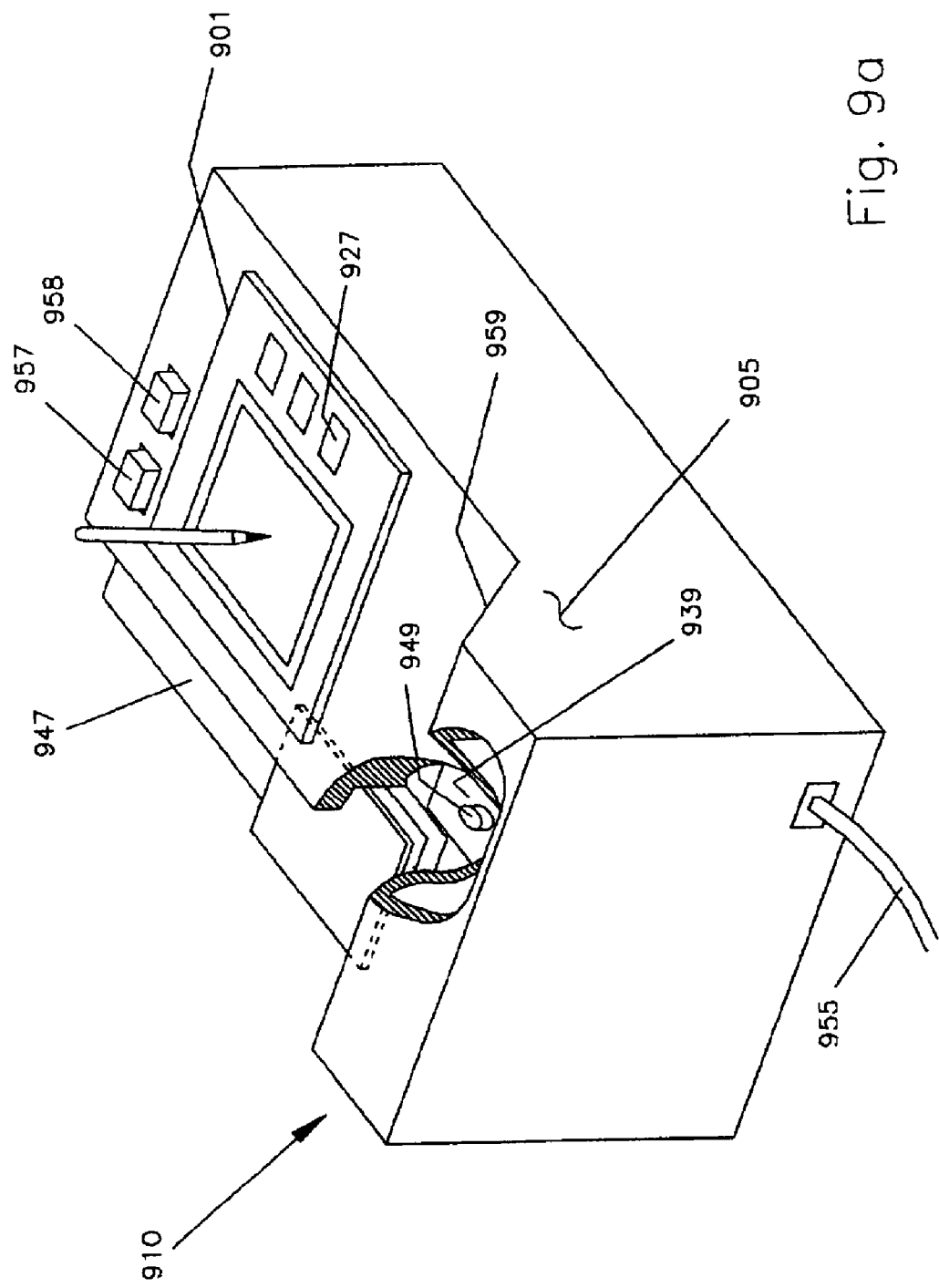
FIG. 9a is an illustration of a point-of-purchase terminal.

For a customer self-service check-out system, the credit card processing device 810 as described in FIG. 8 may be simplified as a point-of-purchase (POP) terminal by eliminating the first display 802 while having the signature verification and related functions performed at the monitor of a central host computer system, which monitors a number of POP terminals used in self-service check-out counters in a store. FIG. 9 illustrates a self-service check-out system having central signature verification capability. A self-service check-out system comprises a central host computer system having monitor 900 and processor 963 which is in communication with a computer network system, and a plurality of point-of-purchase (POP) terminals 910 which are connected to the central host computer system. A POP terminal 910 comprises credit card reader 947, which has features as described in FIGS. 4a, 4b and 4c, having a card slot, a registration glass platen, a magnetic stripe reader, digital camera 939 with lens 949, second display 959 (as shown in second display 59 in FIG. 4b), email approval button 957 and opt-out button 958, a microprocessor, stored control programs, a communication link, and touch-pad input device 901, all of which are supported by housing 905. Optionally a POP terminal may have a touch-pad input device structurally separate from a magnetic stripe reader. A keyboard is optionally added to the POP terminal for email address corrections. A central host computer system includes processor 963, a data buffer, a device driver, monitor 900 including first display 961 with display screen 962, and an operating system which includes a queue control program and OPR, GN, SV, OCR subprograms. A POP terminal's communication link is connected to the central host computer system, which is in communication with a credit card issuer's network system, the Internet and an email system. The queue control program has the function of a status queue that holds pixel data in the data buffer with the device driver monitoring predetermined conditions for the transfer of the pixel data of template signature, test signature and email address for displaying. The function and operation of a status queue is well known in the art. Specifically, the queue control program of the central host computer system of present invention has features of input queuing, selective verification and default mode. The input queuing feature provides the priority and order of delivering the signal pixel data from a credit card reader and a touch-pad input device of a POP terminal for size normalization and displaying on the display screen. The selective verification feature screens an electronic receipt for determining whether a signature verification is needed according to established criteria such as a threshold value of total amount of purchase. The default mode feature allows approval of purchase transactions through selected POP terminals or selected time period depending on the situation of the store operation. These selective verification and default mode features are for speeding up the traffic of the self-service counters or for freeing the operator of the central host computer for other emerging higher priority services without stopping the counter lines. During operation, a POP terminal located at a self-service check-out counter transmits the template signature of a credit card captured by its digital camera and the test signature entered on its touch pad to the central host computer system. Depending on the selection criteria or the default mode, the queue control program of the central host computer system determines the transfer of the template and test signature pixel data to the signature verification program for size normalization. Referring to FIG. 9b, normalized template signature 969 and test signature 976 are displayed on the display screen 962 and that the test signature of interest is verified by actuating the approval-button 975 on the display screen by an authorized operator. If the test signature needs to be repeated then the request-button 978 is actuated which then activates an indicator light on the POP terminal in the queue to signal to the customer to re-enter a test signature. The rejection-button 979 is actuated if a fraud signature is presented. A credit card purchase transaction will not proceed unless the test signature is verified. The same signature verification process applies to all the POP terminals which are in queue with the central host computer system. Additionally, along with the display of the template and test signatures, an identified email address of the same credit card from the same POP terminal is also transferred and displayed. The email address confirmed by the customer is used for transmitting the electronic receipt of the purchase transaction to the customer through the email system of the computer network.

The present invention has been described in detail with reference to preferred embodiments thereof. However, variations and modifications can be implemented within the spirit and scope of this invention. For example, signature normalization and transmission of electronic receipt can be performed by an individual POP terminal which is connected to a central host computer system. Normalized template and test signatures may be programmed to overlap each other for comparison and that signature verification also can be automatically performed with established criteria such that only suspect signatures failing the criteria are subject to the manual approval by an operator at a central monitor. Besides, instead of actuating the approval-button on the display screen, the signature approval can also be accomplished by a keyboard entry.

We claim:

1. A credit card electronic receipt system comprising:
   a. a computer network system in communication with a credit card issuer's communication network and an email system;
   b. a host computer in communication with said computer network system, said host computer having a first display produces an electronic receipt of purchase transactions;
   c. a credit card reader being connected to said host computer, said credit card reader having a magnetic strip reader and a digital camera, and said digital camera captures an email address on an image area on a credit card while said credit card being registered and held stationary, and said magnetic strip reader reads the account number embedded in a magnetic stripe on the credit card when the credit card is being swiped through the magnetic strip reader;
   d. an optical character recognition program, said optical character recognition program identifies characters of the email address; and
   e. a control program in communication with said host computer, said magnetic stripe reader, said digital camera, and said control program inputs said email address and the electronic receipt to the email system.

2. The credit card electronic receipt system of claim 1 includes an optical pattern recognition program which identifies pixel data of the email address and inputs said pixel data to said optical character recognition program.

3. The credit card electronic receipt system of claim 1 wherein the first display of the host computer is in communication with said control program for displaying characters of the email address.

4. The credit card electronic receipt system of claim 1 wherein the credit card reader includes a second display for displaying the characters of the email address.

5. The credit card electronic receipt system of claim 4 wherein the digital camera captures a template signature on the image area on the credit card and the template signature is transmitted to said first display.

6. A credit-card signature verification system comprising:
   a. a computer network system in communication with a credit card issuer's communication network;
   b. a host computer system in communication with said computer network system, said host computer system having a first display produces a purchase transaction receipt;
   c. a point-of-purchase terminal comprising:
      i. a credit card reader having a magnetic strip reader and a digital camera, said digital camera captures an imaging area on a credit card having a template signature while the credit card being registered and held stationary, and said magnetic strip reader reads the account number embedded in a magnetic stripe on the credit card when the credit card is being swiped through the magnetic strip reader;
      ii. a touch-pad input device having output means and said touch-pad input device receives a test signature input from a pen; and
      iii. a control program in communication with said host computer system and said credit-card reader, said control program inputs template signature and test signature to the first display for simultaneous display of said template and test signatures.

7. The signature verification system of claim 6 wherein said first display displays an approval-button which is actuated for activating the credit card authorization process.

8. The signature verification system of claim 7 wherein said first display displays a rejection-button which is actuated for rejecting the purchase transaction of the credit card.

9. The signature verification system of claim 6 includes a signature verification program and a normalization program for providing normalized template and test signatures.

10. The signature verification system of claim 9 wherein the signature verification program and said normalization program utilize global angle and global amplitude for normalizing the sizes of the template and test signatures.

11. The signature verification system of claim 6 wherein said host computer system has a queue control program in communication with the control program of a point-of-purchase terminal which is connected to the host computer system.

12. The signature verification system of claim 11 wherein said host computer system includes a data buffer for storing pixel data of template and test signatures and a device driver for monitoring predetermined condition for transferring said pixel data for signature verification.

13. A credit-card electronic receipt and signature verification system comprising:
   a. a computer network system in communication with a credit card issuer's communication network and an email system;
   b. a host computer system in communication with said computer network system, said host computer system having a first display produces an electronic receipt of purchase transactions;
   c. a point-of-purchase terminal comprising:
      i. a credit card reader having a magnetic strip reader and a digital camera and said digital camera captures an imaging area of a credit card having a template signature and an email address while said credit card being registered and held stationary, and said magnetic strip reader reads the account number embedded in a magnetic stripe on said credit card when the credit card is being swiped through the magnetic strip reader;
      ii. a touch-pad input device having output means receives a test signature input;
   d. an optical pattern recognition program for identifying pixel data of the template signature and the email address;
   e. an optical character recognition program, said optical character recognition program identifies characters of the email address; and
   f. a control program in communication with the host computer system and said point-of-purchase terminal, said optical pattern recognition program and said optical character recognition program, said control program inputs template signature and test signature to the first display for simultaneous display of said template and test signatures, as well as inputs said email address and the electronic receipt to the email system.

14. The credit card electronic receipt and signature verification system of claim 13 including a signature verification program which is in communication with said control program, and said signature verification program normalizes said template signature and said test signature.

15. The credit card electronic receipt and signature verification system of claim 13 wherein said optical pattern recognition program identifies pixels of a demarcation band which separates a first label stripe and a second label stripe.

16. The credit card electronic receipt and signature verification system of claim 15 wherein the optical pattern recognition program uses characteristic gray-level ranges of optical density for identifying dark pixels of the template signature and the characters of the email address from the pixels of said first and second label stripes, said demarcation band, and a background of a surface of the credit card.

17. The credit card electronic receipt and signature verification system of claim 15 wherein the optical pattern recognition program uses border lines pixel data of the frames of said first and second label stripes for excluding pixels outside said first and second label stripes.

18. The credit card electronic receipt and signature verification system of claim 14 wherein said signature verification and optical character recognition programs use the same normalization algorithms for determining a global angle and global amplitudes for size normalization of a test character with respect to a template character.

19. The credit card electronic receipt and signature verification system of claim 13 includes a second display for displaying an identified email address by the optical character recognition program and a keyboard input means for correcting errors in the identified email address.

20. The signature verification system of claim 13 wherein the first display displays an actuation button, said actuation button is actuated for activating the credit card authorization process.

21. The signature verification system of claim 13 wherein said host computer system has a queue control program in communication with the control program of a point-of-purchase terminal which is connected to said host computer system.

22. The signature verification system of claim 21 wherein said host computer system includes a data buffer for storing pixel data of template and test signatures and a device driver for monitoring predetermined condition for transferring said pixel data for signature verification.

23. A credit card processing device in communication with a credit-card issuer's communication network and an email system for authorizing a purchase transaction of a credit card which has a first surface having an account number and a second surface having a magnetic stripe, a template signature and a printed email address, comprising:
   a. a card slot having a first surface and a second surface;
   b. a magnetic strip reader being positioned on the side of the second surface of said card slot for reading the account number embedded in the magnetic stripe of said credit card when said credit card is being swiped through said card slot;
   c. a digital camera positioned on the same side of the second surface of said card slot for capturing an image area including a template signature and an email address of said credit card while the credit card being registered and held stationary, said digital camera provides pixel data of said template signature and said email address;
   d. a processor in communication with said communication network and the email system having a control program, said control program being in communication with said magnetic strip reader and said digital camera for transmitting pixel data of said template signature and the email address for signature verification and email address identification;
   e. a first display and an approval button shown on the first display, said first display and the approval button are in communication with said control program for displaying a template signature and a test signature;
   f. a touch pad for entering a test signature, said touch pad being in communication with said control program for transmitting the test signature to said first display;
   g. a second display being positioned opposite to said first display and facing the touch pad, said second display being in communication with said control program for displaying an email address; and
   h. a housing supporting said card slot, said magnetic strip reader, said digital camera, said control program, said processor, said first display, said touch pad, and said second display.

24. A credit card used in the electronic receipt and signature verification system of claim 13 comprising:
   a. a first surface having an account number, expiration date, and name of card owner;
   b. a second surface having a magnetic stripe embedded with said account number, a first label stripe having a template signature, and a second label stripe having a printed email address.

* * * * *